May 11, 1965
A. P. STEWART, JR
3,182,975
STEAM INJECTION HEATER
Filed May 4, 1961
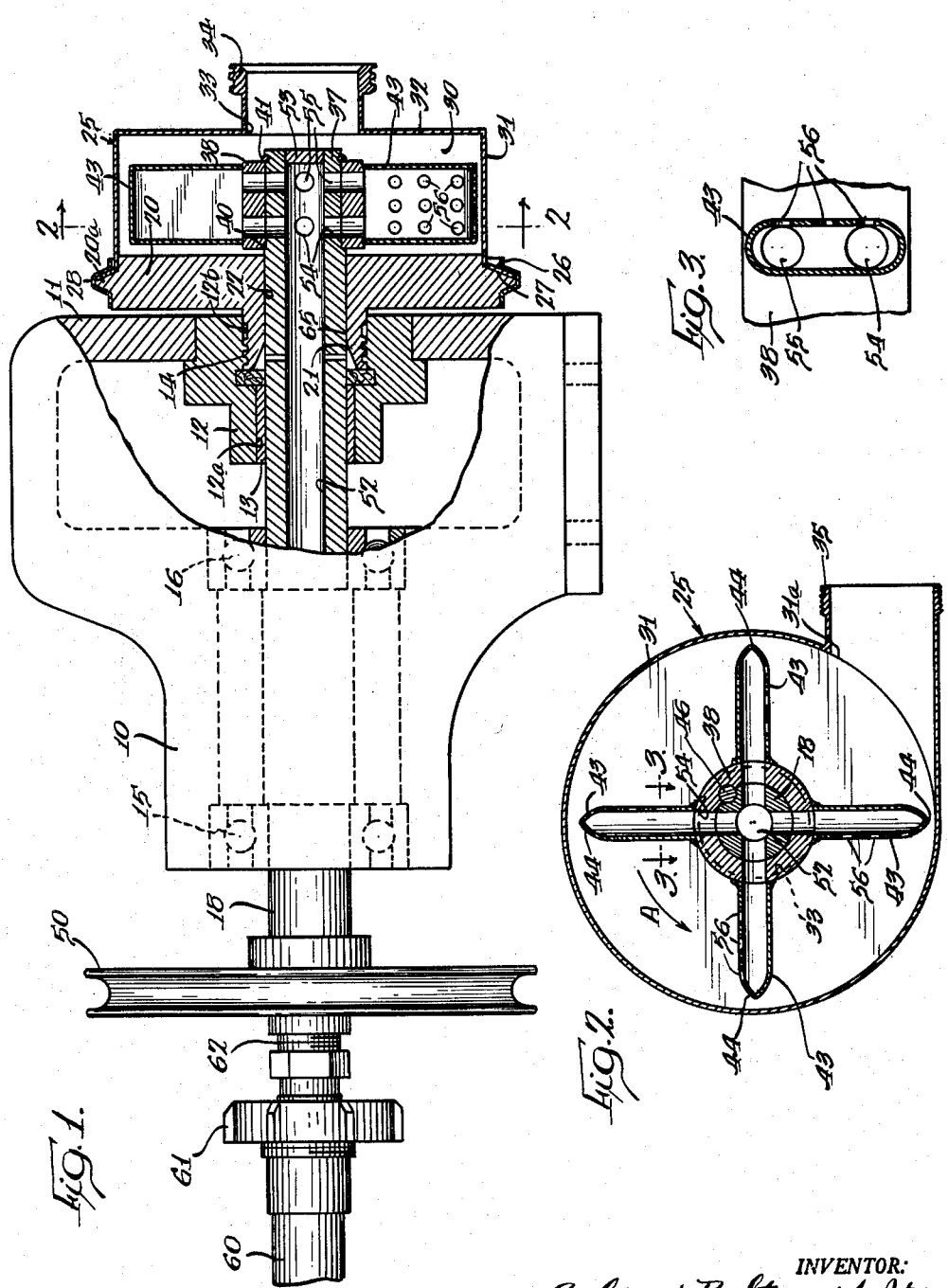
INVENTOR:
Aubrey P. Stewart, Jr.
BY
Hofgren, Brady, Wegner,
Allen & Stellman
Attys

United States Patent Office 3,182,975
Patented May 11, 1965

3,182,975
STEAM INJECTION HEATER
Aubrey P. Stewart, Jr., Corning, Iowa, assignor to Nodaway Valley Foods Inc., a corporation of Iowa
Filed May 4, 1961, Ser. No. 107,824
1 Claim. (Cl. 261—34)

This invention relates to a heating apparatus and more particularly to a steam injection heater to heat a fluid instantaneously as the fluid is passed through the heater.

A common difficulty experienced with steam injection heaters now available is the excessively high pressures created within the heating chamber when steam is injected into the chamber to contact the fluid to be heated. The pressure of the fluid within the heater chamber may reach an approximation of the steam pressure fed into the heater and, with a small drop in the steam pressure the fluid within the heater will back up into the steam line. Similarly, a temporary drop in the pressure of the fluid being supplied to the heater will allow the steam to back up into the fluid feed line. Another disadvantage of such steam injection heater arises in the case of milk since the proteins in the milk have a tendency to "burn" onto the contact surfaces of the heater adjacent the point of steam injection. This imparts an undesirable flavor to the milk.

A primary object of this invention is to provide a new and novel method and apparatus for instantaneously heating a fluid to a controlled temperature by injecting steam into such fluid.

Another object of the invention is to provide a fluid heating apparatus whereby efficient heating of a liquid is accomplished using lower liquid feed pressures and lower steam feed pressures than are required in present day steam heating apparatus.

Still another object of this invention is to provide a steam injection heating apparatus whereby the steam is efficiently mixed with the fluid in the heater and the fluid is rapidly heated to a desired temperature.

Another object is to provide a steam injection heating apparatus for heating a fluid such as milk which prevents proteins within the milk from "burning" onto the contact surfaces of the heater.

It is a further object of this invention to provide a heating apparatus whereby fluid is introduced through an inlet opening into a chamber and is moved by hollow rotatable impeller blades within the chamber out through an outlet opening, the apparatus also having means supplying steam through the impeller blades whereby it is intimately mixed with the fluid as it is moved from said inlet opening out through said outlet opening thereby heating the fluid.

Still another object is to provide a heating apparatus such as described in the preceding paragraph including a shaft having an axial bore therethrough and extending within the chamber for mounting the impeller blades, and means introducing steam through the axial bore of the shaft and through holes in the impeller blades to the chamber.

A further object is to provide a method for heating fluids whereby steam is injected to the fluid at a point of temporary lowered pressure and immediately thereafter the pressure is increased at this temporary point to intimately mix the steam and the fluid to rapidly heat the fluid while maintaining a substantial differential between the fluid input pressure and the steam input pressure.

Further features and advantages of the invention will be readily apparent from the following description and the drawings in which:

FIGURE 1 is a side elevational view partially broken away in section illustrating the heating apparatus embodied in the invention;

FIGURE 2 is a cross-sectional view taken substantially along the line 2—2 of FIGURE 1; and FIGURE 3 is a sectional view of an impeller blade taken substantially along the line 3—3 of FIGURE 2.

While this invention is susceptible in embodiment in many different forms, there is shown in the drawings and herein will be described in detail one specific embodiment with the understanding that the present disclosure is to be considered as an exemplification of the principles of the invention and is not intended to limit the invention to the embodiment illustrated. The scope of the invention will be pointed out in the appended claims.

FIGURE 1 shows a preferred embodiment of the invention which comprises a housing member 10 having a front face 11 which mounts a locking nut member 12. The locking nut member 12 has an axial bore 12a therethrough, the rear portion of which contains a bushing 13. The forward portion of the bore 12b is of a larger diameter and is threaded as at 14. A pair of bearings 15 and 16 (shown in dotted lines) are mounted in the housing 10 in axial alignment with the bore of the locking nut 12 and together with the bushing 13 rotatably support a shaft 18 that extends outwardly from either end of the housing.

The chamber for mixing the fluid and steam comprises a circular back plate 20 having an externally threaded boss 21 and an axial bore 22 therethrough. The boss 21 is threadedly engaged in bore 12b of locking nut 12. Shaft 18 extends through the bore 22 and is rotatable therein. A circular cup-like casing member 25 has an outwardly turned flange 26 around the periphery of the open end thereof which rests against an undercut surface 27 around the outer periphery of the back plate 20. A circular spring clip 28 having a U-shaped cross-section surrounds the outer periphery of the back plate 20 and keeps the flange 26 in tight pressing contact with the surface 27 to form a fluid seal therebetween. An enclosed mixing chamber 30 is thereby formed which includes the back plate or wall 20, a peripheral side wall 31 which consists of the peripheral side of the circular cup-shaped casing 25, and a front wall 32 which consists of the closed top portion of the casing 25. The front wall 32 of the mixing chamber has a central opening 33 and a flanged passageway 34 extending longitudinally outward therefrom through which fluid to be heated is introduced into the chamber 30 by means not shown. A passageway 35 (shown in FIG. 2) communicates tangentially with the chamber 30 through an opening 31a in the side wall 31. The fluid is discharged through this opening and passageway.

A forward end 37 of the shaft 18 extends into the chamber 30 and supports an annular ring or hub 38 which is confined on the shaft between a shoulder 40 and a snap ring 41.

The annular ring 38 forms a hub for a series of impeller blades 43 that are equally spaced about the outer peripheral surface of the ring and extend radially outward therefrom to a point in near proximity to the side wall 31 of the chamber as shown in FIGURE 2. Each of the impeller blades 43 are preferably formed from a short piece of pipe which has been flattened into an oval cross-section as shown in FIGURE 3 and has one end closed off and welded together as at 44. The open end of each impeller blade is welded to the hub 38 with a broad surface of the impeller in a plane substantially parallel to the axial plane of the shaft. The hub 38 is precluded from rotating relative to the shaft 18 by a key 46 so that the entire impeller assembly is rotatable in the chamber 30 with the shaft.

The portion of the shaft 18 extending rearward of the housing 10 has a sheave 50 fixedly mounted thereon which is driven by an external power source (not shown) thereby rotating the impellers 43 in the direction of the arrow A shown in FIGURE 2. This rotation will cause any fluid introduced into the chamber 30 through the passageway 34 to move out through the passageway 35.

The shaft 18 has an axial bore 52 extending throughout its entire length. A plug 53 seals off the forward end 37 of the shaft. Sets of radial holes 54 and 55 are provided in the forward portion 37 of the shaft. These holes pass through the hub member 38 to form a communication between the shaft bore 52 and the interior of each of the impeller blades 43. A series of holes 56 is provided in the broad surface of each of the impeller blades 43. These holes are located on the back or trailing surface of the blades as they spin in the indicated direction.

A steam line 60 has one end connected to a source of pressurized steam (not shown) and the other to a liquid revolving joint 61 which is threadedly connected at 62 to the pipe 18. It can be seen that steam from the steam line will thus be continually passed into the chamber 30 through the bore 52, the holes 54 and 55, the interior of the impeller blades 43 and out through the holes 56. A suitable seal 65 is provided about the shaft 18 and confined in the locking nut member 12 to prevent fluid leakage from chamber 30.

In operation, a source of fluid to be heated is connected to the passageway 34 at a predetermined pressure and flow rate. The outlet passageway 35 is connected to processing equipment for subsequent handling of the heated fluid. Steam is supplied through the steam line 60 at a predetermined pressure and flow rate and the shaft 18 is rotated in a counterclockwise (FIG. 2) direction by an external power supply through the sheave 50. As the impeller blades 43 move the fluid from the inlet passageway 37 through the chamber and out through the passageway 35, steam is injected into the fluid through the holes 56 in the impeller blades. Since the holes 56 are on the back or trailing surface of the impeller as it rotates in a counterclockwise direction, the steam is injected into the fluid at an area of cavitation, or low pressure, behind the blades. The leading edge of the following blade then mechanically forces the steam into intimate mixture with the fluid, imparting rapid heating of the fluid and creating a high degree of agitation or movement of the steam and fluid within the chamber 30. The high degree of agitation prevents fluid such as milk from "burning on" the surfaces of the heater elements. The unique manner in which the steam is allowed to enter the fluid keeps the steam entry holes 56 from clogging and the mechanical action of the impeller blades is such that even a very viscous fluid can be transferred and heated quickly and efficiently.

The following test runs of the described embodiment of the steam injection heater are illustrated to show the manner in which the invention functions to accomplish efficient heating with a lower liquid feed pressure and a lower steam feed pressure than other steam injection heaters in use today.

Test 1

A tank of milk was heated to 195° F. and connected to a positive pump which in turn pumped the milk to the disclosed steam injection heater. Heated milk from the heater was then piped through a back-pressure valve and a cooler and then discharged into a final measuring tank. The impeller assembly was run at a speed of 1750 revolutions per minute and the flow rate of the milk was 467 gallons per hour. The back-pressure valve was set at 64 pounds per square inch gauge and the steam flow regulated to sufficiently heat the milk from 195° F. to 262° F. The inlet pressure of the milk just before entering the heater was measured at 44 pounds per square inch gauge and the steam pressure entering the heater at 57 pounds per square inch gauge.

The second part of the test was run with the impeller stopped, thus simulating other types of steam injection heaters. The same flow rate of 467 gallons per hour of milk and the same steam flow were used. The pressure of milk entering the heater was measured at 63 pounds per square inch gauge, the pressure of the steam entering the heater was 70 pounds per square inch gauge and the final milk temperature was 256½° F.

Test 2

In this test the flow rate of the milk was again 467 gallons per hour and the back-pressure valve was set at 34 pounds per square inch gauge. The steam flow was set to raise the temperature of the milk to 271° F. at the outlet of the heater. The pressure of the milk entering the heater was measured at 28 pounds per square inch gauge and the pressure of the steam line feeding the heater was measured at 44 pounds per square inch gauge. In phase two of this test, with the impeller stopped, and the milk and steam flow rate maintained at the same level to achieve the same final temperature, the pressure of the milk entering the heater was 35 pounds per square inch gauge and in the steam line feeding the heater, 49 pounds per square inch gauge.

The above tests illustrate that lower liquid feed pressures and lower steam feed pressures may be used in the disclosed heater. During these tests it was noted that the temperature of the milk as it left the heater was more uniform when the impeller was rotated than with the impeller stopped. The temperature fluctuation during one hour's running time was no more than plus or minus one-half of a degree Fahrenheit whereas with the impeller stopped the fluctuation was plus or minus two degrees Fahrenheit.

The steam injection heater has been operated continuously, heating milk from 185° F. up to 300° F. for a period of eight hours without more than a trace of "burn-on" from milk proteins in evidence on the surface of the heater elements at the end of the run. Experience in operating at least a dozen conventional types of steam injection heaters invariably showed considerable "burn-on" after such a long operating period when heating milk.

No difficulty has been experienced with the described heaters, as with other heaters, from milk backing up into the steam feed line. This is because of the pressure differential between the fluid and the steam and also because the steam flow is always injected into the fluid at a point of cavitation or temporary low pressure behind the rotating impeller blade.

It has been further noted that a single size of the described steam injection heater will heat a wide range of flow rates of fluid over a wide range of temperatures. For example, one particular unit of the described steam injection heater functioned satisfactorily at flow rates of fluid into the heater ranging from 100 to 900 gallons per hour and over a temperature range of heating between 200° F. and 330° F. This feature gives a wide range of applications for the steam injection heater for many different flow rates as well as a wide variety of fluids having different viscosities.

I claim:

A steam injection heater for rapidly and uniformly heating milk comprising, a casing having a cylindrical chamber therein, means for introducing milk into and withdrawing milk from said chamber including an inlet to the chamber positioned on the axis thereof and an outlet from the chamber positioned on the circumference thereof and extending tangentially therefrom, a hollow shaft rotatably mounted in the casing and extending into the chamber, an impeller mounted on the shaft within the chamber, said impeller having a plurality of blades having a substantially flat rear face extending generally axially of the chamber, said blades being movable in a circular path with rotation of the shaft with said path including the major portion of the chamber, a plurality of steam outlets on the rear face of each blade, passages in the blades establishing communication between said steam outlets and the hollow of the shaft, means for introducing steam under pressure into said hollow during rotation of the shaft whereby the steam will be introduced into milk in the chamber at areas of low pressure adjacent the rear faces of the blades and in the path of the advancing front face of the next succeeding blade to rapidly distribute the heat of the steam through a quantity of milk uniformly to heat the same.

References Cited by the Examiner

UNITED STATES PATENTS

| | | | |
|---|---|---|---|
| 302,882 | 8/84 | Ashcroft | 261—87 |
| 1,632,758 | 6/27 | Fulweiler et al. | 261—87 |
| 2,041,184 | 5/36 | Isenhour. | |
| 2,492,635 | 12/49 | Hawk | 99—251 X |
| 2,874,894 | 2/59 | Goldschmied. | |
| 3,066,921 | 12/62 | Thommel et al. | 261—87 |
| 3,123,652 | 3/64 | Gross | 261—87 |

GEORGE D. MITCHELL, *Primary Examiner.*

HARRY B. THORNTON, HERBERT L. MARTIN,
*Examiners.*